(12) United States Patent
Hirzmann

(10) Patent No.: US 7,374,203 B2
(45) Date of Patent: May 20, 2008

(54) VEHICLE STEERING WHEEL

(75) Inventor: Guido Hirzmann, Sailauf (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 320 days.

(21) Appl. No.: 11/151,994

(22) Filed: Jun. 14, 2005

(65) Prior Publication Data
US 2005/0280250 A1 Dec. 22, 2005

(30) Foreign Application Priority Data
Jun. 17, 2004 (DE) .................. 20 2004 009 568 U

(51) Int. Cl.
B60R 21/16 (2006.01)
B62D 1/04 (2006.01)

(52) U.S. Cl. ...................... 280/731; 74/552; 280/728.1

(58) Field of Classification Search ................ 280/731, 280/728.1; 74/552
See application file for complete search history.

(56) References Cited

U.S. PATENT DOCUMENTS 5,383,682 A * 1/1995 Nagata et al. .............. 280/777

2002/0047255 A1* 4/2002 Baume et al. ............... 280/775

FOREIGN PATENT DOCUMENTS

| DE | 4220016 | 12/1993 |
| DE | 43209876 | 1/1995 |
| DE | 29907365 | 8/1999 |
| DE | 19853883 | 5/2000 |
| DE | 20312826 | 4/2004 |
| JP | 59160328 | 1/1983 |
| JP | 59032540 | 2/1984 |
| JP | 06072421 | 3/1994 |
| JP | 2002/019619 | 1/2002 |
| JP | 2002127911 | 5/2002 |

* cited by examiner

Primary Examiner—Eric Culbreth
(74) Attorney, Agent, or Firm—Tarolli, Sundheim, Covell & Tummino LLP

(57) ABSTRACT

A vehicle steering wheel includes a steering wheel body having a hub, a separate functional unit fastened to the hub, in particular a gas bag module, and a microphone. The microphone is arranged in a lateral gap between the steering wheel body and the functional unit.

11 Claims, 5 Drawing Sheets

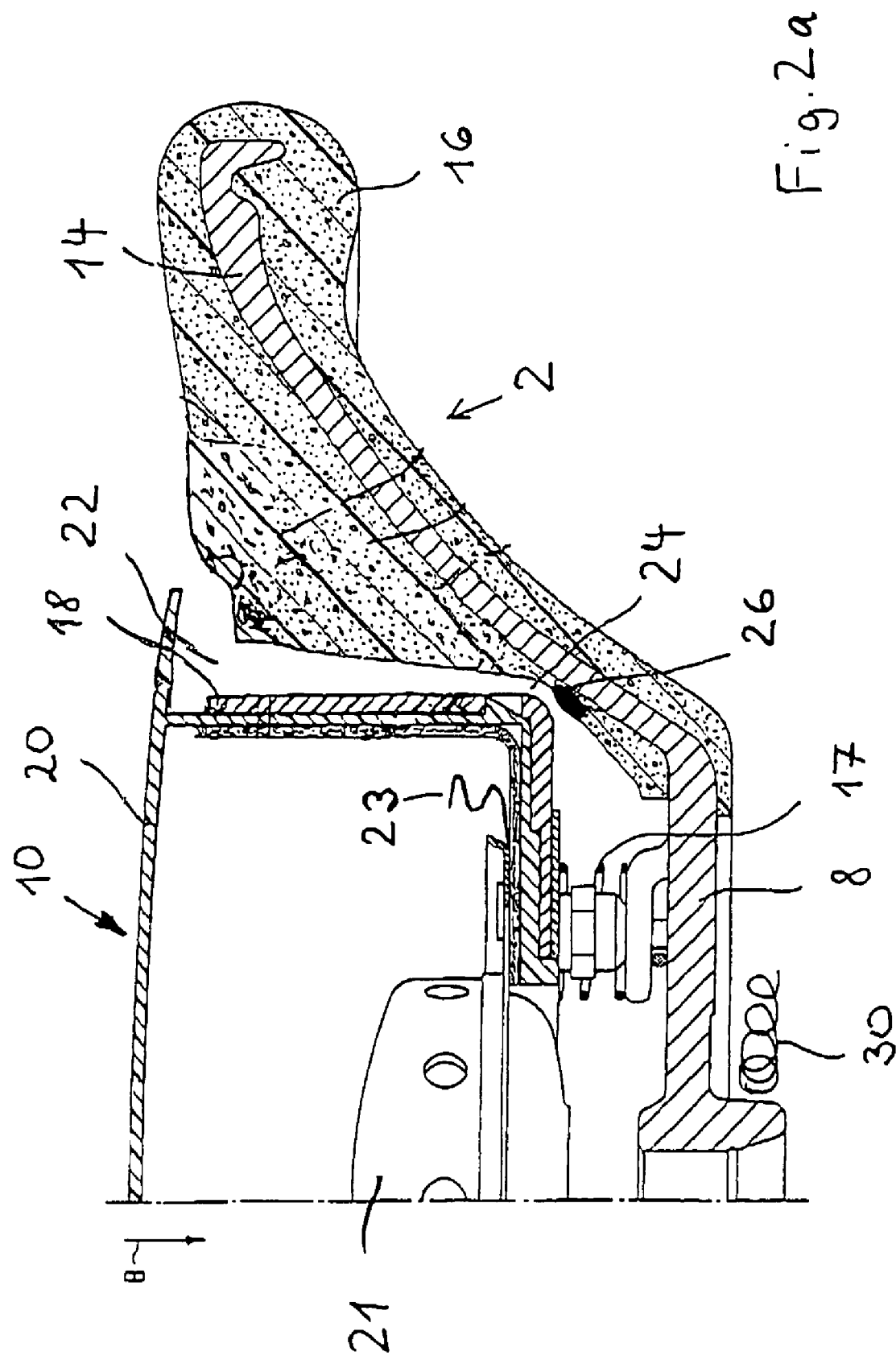

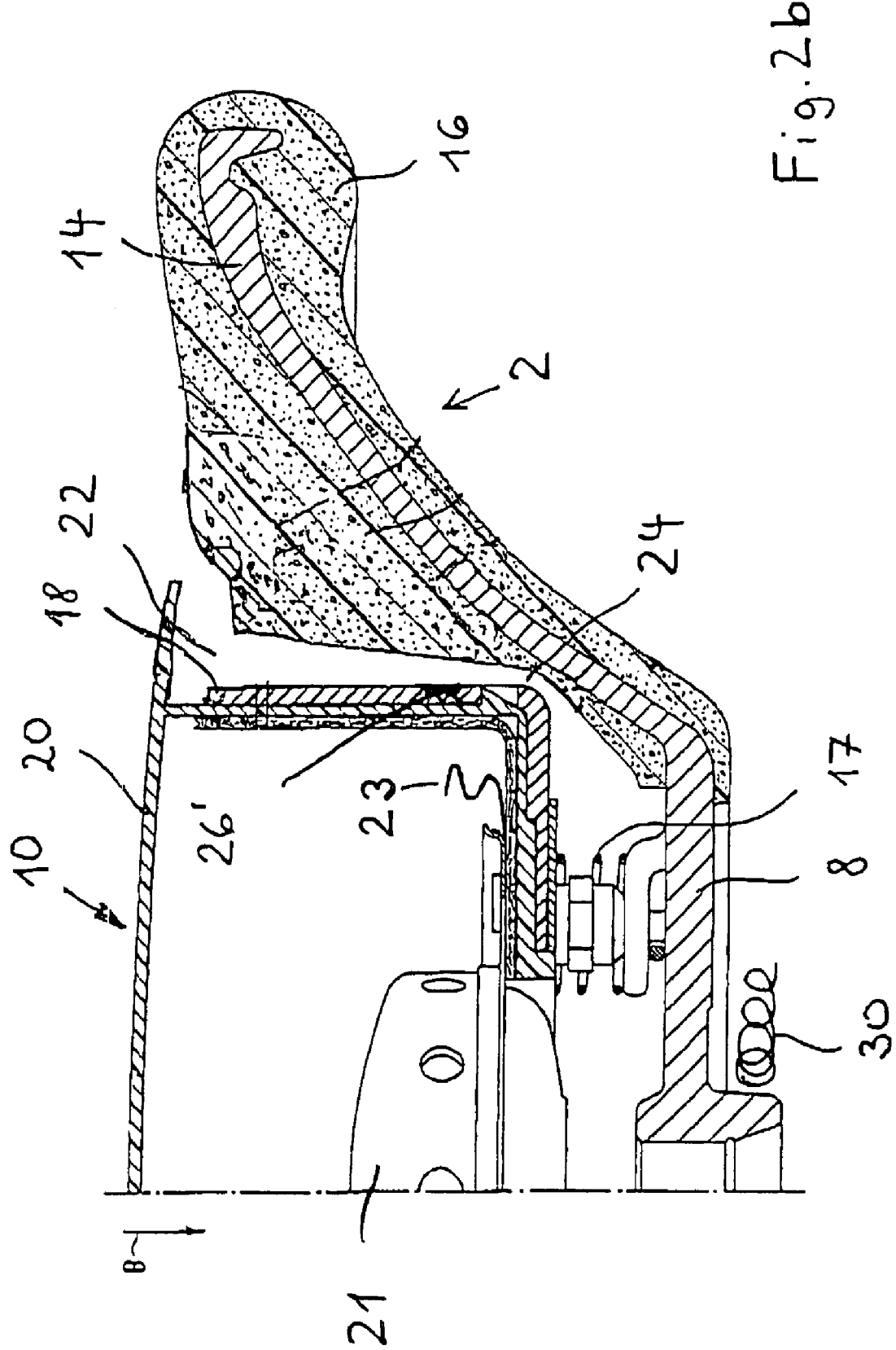

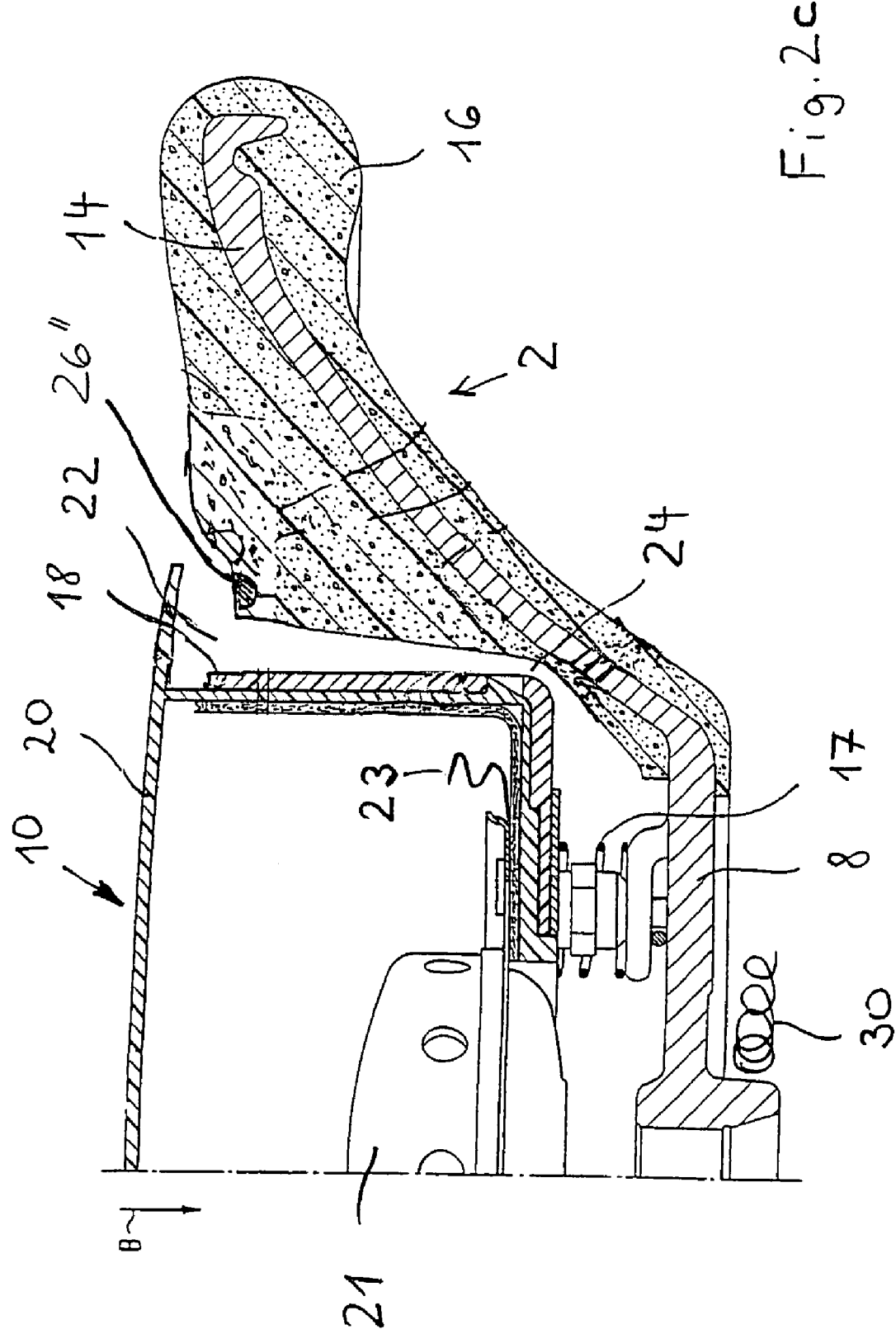

VEHICLE STEERING WHEEL

TECHNICAL FIELD

The invention relates to a vehicle steering wheel, with a steering wheel body having a hub, a separate functional unit fastened to the hub, in particular a gas bag module, and a microphone.

BACKGROUND OF THE INVENTION

Hitherto, fixed microphones in a vehicle for a car telephone are integrated into an interior light module or are provided in the region of an instrument panel. The speech quality here is of course in need of improvement owing to the vicinity of the outer skin of the vehicle, owing to the blowing noises of the ventilation and owing to the large distance of the occupants from the microphone.

Consideration has been given to integrating the microphone into the steering wheel. These attempts have, however, not been realized hitherto, because the microphone on the one hand is to sit as close as possible on the surface of the steering wheel and on the other hand a sufficient reception sensitivity must still exist, when the driver touches the spot of the steering wheel on which the microphone is provided.

BRIEF SUMMARY OF THE INVENTION

The invention provides a vehicle steering wheel with integrated microphone which is distinguished by a good and interference-free reception quality, largely free of background noises. This is achieved in a vehicle steering wheel, with a steering wheel body having a hub, a separate functional unit fastened to the hub, in particular a gas bag module, and a microphone, the microphone being arranged in a lateral gap between the steering wheel body and the functional unit. The functional unit, e.g. the gas bag module, is a separate component which is fastened to the steering wheel body, usually a gap always being present laterally between the outer surface of the gas bag module and an adjoining foam coating of a steering wheel skeleton. According to the invention, this gap is now utilized by the microphone being arranged in it. The microphone is thereby protected from the influence of blowing air and can not be touched by the driver and therefore not be covered. A better microphone pick-up characteristic is also provided for the driver, because the latter speaks directly into the microphone. Background noises, in particular at low frequency spectra, are not transferred so strongly through the gap and the material bordering the gap as in a microphone in the interior light. The gap is a low-reflection structural space, which is now technically taken advantage of for the first time. When the hand covers the gap, a reduction of the loudness and hence of the sensitivity of approximately only 3 dB occurs, which is entirely acceptable.

Preferably the microphone is arranged close to a base or on a base of the gap. However, it can also be integrated in the side walls of the functional unit, more precisely of its housing, or laterally in the wall of the steering wheel body delimiting the gap.

Preferably, the microphone is embedded into a plastic outer layer of the functional unit or of the steering wheel body. It is particularly advantageous here if the microphone is embedded into a foam coating of the steering wheel skeleton, which can possibly even take place already in the manufacture of the steering wheel body. The microphone is thereby connected reliably and securely with the steering wheel body.

According to the preferred embodiment, the gap is open laterally and towards the driver.

In particular, the gap is used which is provided between the outer surface of the gas bag module and the spokes of the steering wheel body. Here, the gap is particularly short in its longitudinal extent, so that sound waves can still enter into it laterally when the driver's hand covers the gap on the front side.

No separate wires are required for the microphone for transferring the signals from the steering wheel to the vehicle. The invention makes provision that a modulator modulates the microphone signals to a current supply of the steering wheel electronics already present. The signal then runs via a likewise always present spiral spring to the electronics of the steering column jacket module, where the signal is picked up again, decoded and converted into a line-in-compatible audio signal. This signal is made available to the telephone unit for further processing.

If sufficient free spiral spring paths are present, the signals can also be transmitted directly to the telephone unit.

BRIEF DESCRIPTION OF THE DRAWINGS

FIG. 2a shows a sectional view along line II-II in FIG. 1 in the region of the gap showing a first location for a microphone, FIG. 2b shows a sectional view similar to FIG. 2a showing a second location for a microphone, FIG. 2c shows a sectional view similar to FIGS. 2a and 2b showing a third location for a microphone.

DETAILED DESCRIPTION OF THE PREFERRED EMBODIMENTS

Figure 1:
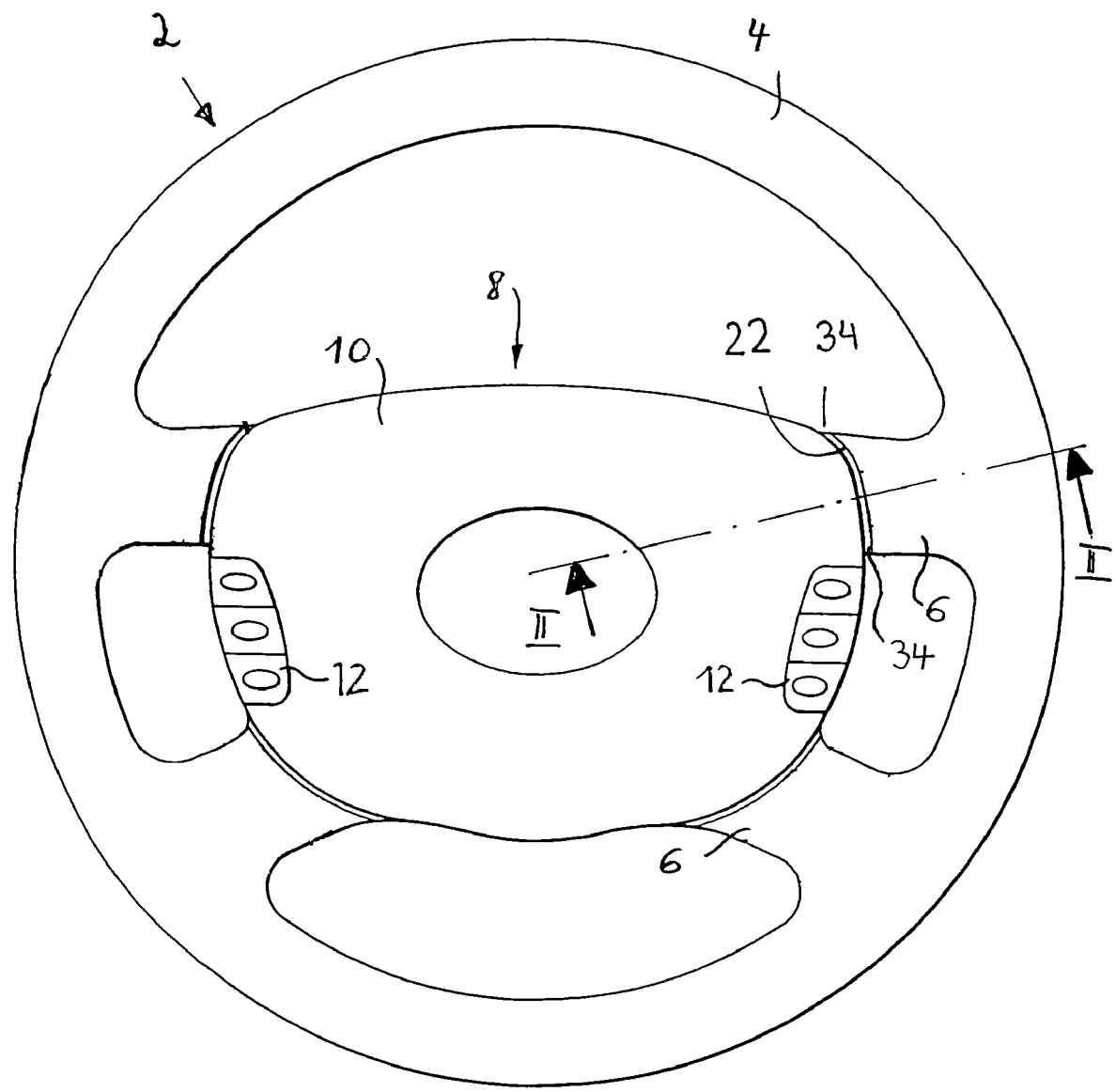
FIG. 1 shows a top view onto a vehicle steering wheel according to the invention.

FIG. 1 shows a vehicle steering wheel, with a steering wheel body 2 having a steering wheel rim 4, spokes 6 and a hub 8. A separate electric functional unit, constructed as a pre-assembled part, in the form of a gas bag module 10 is fastened on the hub 8. On the gas bag module 10 in turn multifunction switches 12 are arranged, which thus form a part of the functional unit.

In FIGS. 2a-c it can be seen that the steering wheel body 2 has a metal skeleton 14 which is foam-coated over a large area except for the hub 8. The foam coating is referred to as 16. It forms the outer border of the part of the steering wheel body 2 which is visible from the exterior in the installed state.

The gas bag module 10 is a so-called floating horn module which is axially displaceable by means of springs 17 in the direction of the arrow B, in order to actuate a horn. The gas bag module 10 has a housing with a cup-shaped container body 18 and a lid-shaped cover 20, both made of plastic. A gas generator 21 and a gas bag 23 are accommodated inside the housing.

Laterally between the outer surface of the housing, in this case of the container body 18, and the steering wheel body 2, a gap 22 is produced in the region of the spokes 6. This gap 22 is delimited on the side of the steering wheel body 2 by the foam coating 16. In the region of a base 24 of the gap 22, a microphone 26 (FIG. 2a) is embedded into the foam coating 16, so that only its outer side is exposed with respect to the foam coating 16. The microphone 26 is therefore non-detachably connected with the steering wheel body 2. Alternatively, the microphone can also be integrated in a side wall formed by the housing of the gas bag module 10 or in an opposite side wall formed by the foam coating 16. These microphones, thus arranged, are designated by reference signs 26' (FIG. 2b) and 26" (FIG. 2c) respectively.

Figure 3:
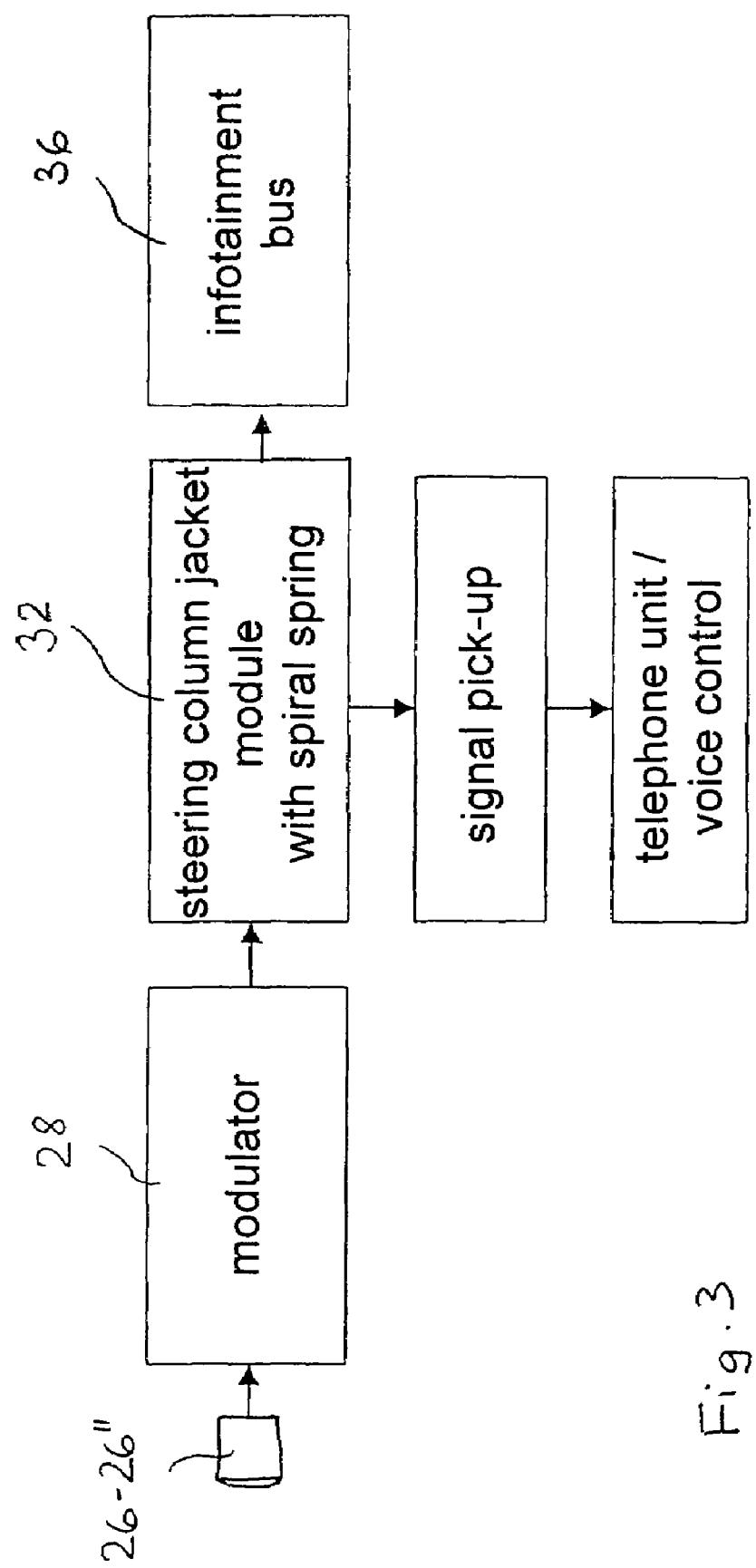
FIG. 3 shows a block diagram showing the signal flow between microphone and telephone unit.

Cables run from the microphones 26 to 26" to a modulator 28 provided in the steering wheel (see FIG. 3), which modulates the microphone signal to a current consumption of the steering wheel electronics (for multifunction switches 12 and gas generator 21). The signal runs via a spiral spring 30 (see FIG. 2), which is provided in any case, to the electronics of an steering column jacket module 32. Here the signal is picked up again (e.g. by a shunt resistor), amplified and converted into a line-in-compatible audio signal. This line-in signal is made available to the telephone unit for further processing. As already previously mentioned, with a suitable spiral spring a direct signal connection from the microphone to a telephone unit can also be realized.

The gap 22 is open towards the driver and the sides 34, so that the microphone 26 to 26", which is otherwise not visible from the exterior, also receives the driver's sound waves to a sufficient extent when the latter covers the gap 22 on the front side. The gap 22 can alternatively also be delimited by an outer housing of the multifunction switches 12, which in this embodiment would then be moved upwards to the spokes 6. Alternatively, the electric functional unit could also be formed by another electronic unit, e.g. a separate multifunction switch unit 12, which is uncoupled mechanically from the gas bag module 10.

The following advantages can be achieved through the microphone 26 to 26" integrated in the region of the gap 22: No additional wires are required in the spiral spring 30 for the microphone 26 to 26". Because of the current loop transmission, the signal transmission is insensitive to interference. The modular electronics are constructed very simply. The microphone 26 to 26" lies in a low-reflection structural space, well protected with respect to the exterior. It can be integrated very simply into an already existing infotainment bus 36 for the steering wheel.

The invention claimed is:

1. A vehicle steering wheel, with
   a steering wheel body (2) having a hub (8),
   a separate functional unit fastened to the hub (8), and
   a microphone (26-26"),
   said microphone (26-26") being arranged in a lateral gap (22) between said steering wheel body (2) and said functional unit.

2. The vehicle steering wheel according to claim 1, wherein said microphone (26-26") is integrated into one of said functional unit and said steering wheel body (2).

3. The vehicle steering wheel according to claim 1, wherein said microphone (26-26") is embedded into a plastic outer layer of one of said functional unit and said steering wheel body (2).

4. The vehicle steering wheel according to claim 1, further comprising a steering wheel skeleton (14) with a foam coating (16), wherein said microphone (26-26") is embedded into said foam coating (16) of said steering wheel skeleton (14).

5. The vehicle steering wheel according to claim 1, wherein said gap (22) is provided between an outer surface of said functional unit (10) and spokes (6) of said steering wheel body (2).

6. The vehicle steering wheel according to claim 1, wherein no separate wire out of said steering wheel to a telephone unit is provided for said microphone (26-26").

7. The vehicle steering wheel according to claim 1, further comprising a modulator (28) which modulates a microphone signal to a current consumption of a steering wheel electronics.

8. The vehicle steering wheel according to claim 1, wherein said functional unit is a gas bag module (10).

9. A vehicle steering wheel, with
   a steering wheel body (2) having a hub (8),
   a separate functional unit fastened to the hub (8), and
   a microphone (26-26"),
   said microphone (26-26") being arranged in a lateral gap (22) between said steering wheel body (2) and said functional unit, and close to a base (24) of said gap (22).

10. A vehicle steering wheel, with
    a steering wheel body (2) having a hub (8),
    a separate functional unit fastened to the hub (8), and
    a microphone (26-26"),
    said microphone (26-26") being arranged in a lateral gap (22) between said steering wheel body (2) and said functional unit, and on a base (24) of said gap (22).

11. A vehicle steering wheel, with
    a steering wheel body (2) having a hub (8),
    a separate functional unit fastened to the hub (8), and
    a microphone (26-26"),
    said microphone (26-26") being arranged in a lateral gap (22) between said steering wheel body (2) and said functional unit
    said gap (22) being open partially laterally and towards the driver.

* * * * *